Feb. 25, 1969 TADAO KOHASHI 3,430,051

PHOTOCONDUCTIVE-ELECTROLUMINESCENT DEVICE HAVING SPECIAL PHASE OR FREQUENCY RELATIONSHIP BETWEEN THE INCIDENT LIGHT SIGNAL AND THE ELECTRICAL EXCITING SIGNAL

Filed Dec. 20, 1965

INVENTOR

Tadao Kohashi

BY Stevens, Davis, Miller & Mosher

ATTORNEYS

INVENTOR
Tadao Kohashi
BY Stevens, Davis, Miller & Mosher
ATTORNEYS

Feb. 25, 1969 TADAO KOHASHI 3,430,051

PHOTOCONDUCTIVE-ELECTROLUMINESCENT DEVICE HAVING SPECIAL PHASE OR FREQUENCY RELATIONSHIP BETWEEN THE INCIDENT LIGHT SIGNAL AND THE ELECTRICAL EXCITING SIGNAL

Filed Dec. 20, 1965 Sheet 3 of 3

INVENTOR

Tadao Kohashi

BY Stevens, Davis, Miller & Mosher

ATTORNEYS

United States Patent Office 3,430,051

Patented Feb. 25, 1969

3,430,051

PHOTOCONDUCTIVE - ELECTROLUMINESCENT DEVICE HAVING SPECIAL PHASE OR FREQUENCY RELATIONSHIP BETWEEN THE INCIDENT LIGHT SIGNAL AND THE ELECTRICAL EXCITING SIGNAL

Tadao Kobashi, Yokohama, Japan, assignor to Matsushita Electric Industrial Co., Ltd., Osaka, Japan, a corporation of Japan Filed Dec. 20, 1965, Ser. No. 515,081
Claims priority, application Japan, Dec. 23, 1964, 39/74,082
U.S. Cl. 250—213 31 Claims
Int. Cl. H01j *31/50*

ABSTRACT OF THE DISCLOSURE

A solid state energy, responsive luminescent device comprising an energy responsive element such as a photoconductive element and a luminescent element such as an electroluminescent element, the operational characteristic of which is made variable by making the relation between an intensity modulated energy signal incident upon the device and an operational voltage which is a pulsing or A.C. voltage, such as phase difference, waveform or frequency adjustable and variable under a synchronized condition of the incident signal and the operating voltage.

The present invention relates to a solid state energy-responsive display apparatus, comprising an energy-responsive element the electric impedance of which varies in accordance with the intensity of an incident energy, and a luminescent element, the intensity of luminescence of which varies depending on the strength of an electric field applied thereto.

Such an energy-responsive element has been in the form of a photoconductive element, the electric impedance of which reduces when the element is excited by an energy such as light, radiation, electron beam or the like, while such a luminescent element has been in the form of an electroluminescent element which is responsive to pulsing or alternating electric field applied thereto, the intensity of its luminescence varying in accordance with the applied electric field. Moreover, various types of solid state energy-responsive display apparatus have been proposed, examples thereof being solid state light amplifiers, solid state image intensifiers, solid state image reversing amplifiers, and the like.

Wide range adjustability and variability of the operational characteristic have been required for such an apparatus in practical application. These have been accomplished through material and structural adjustments or by adjusting a power source, but without satisfactory results.

It is an object of the present invention to provide a solid state energy-responsive luminescent device the operational characteristic of which is made adjustable or variable over a wide range by a unique method, which may be called photoelectric phase control, for enabling adjustment and variation of the relation between a supplied operating electrical signal and an incident pulsing or pulsating energy signal.

The invention is based fundamentally upon the following two concepts: First, an energy-responsive element is excited by an incident modulating pulsing or pulsating energy signal which is intensity modulated through an intensity modulating means, if desired. The adjustability and variability of the operational characteristic of the energy-responsive luminescent device over a wide range may be attained by using a pulsing or alternating electric signal for operating a luminescent element and by making the phase relation between the above two signals adjustable or variable. Second, the wide range adjustability or variability of the operational characteristics is effected by controlling the relation between the incident modulating energy signal and the operational electric signal by either discontinuously adjusting or varying the relative frequency relation between the two signals or by adjusting or varying the relative wave form relation by adjusting or varying the wave form of either one of the two signals within the range of a preset synchronous state.

The invention rests upon the following principle. Since, as described previously, intensity of luminescence of the luminescent element used varies in accordance with the applied electric field, intensity of luminescence of the luminescent element operating in response to the electric pulsing or alternating signal varies periodically as a function of instantaneous intensity of the applied electric field as the electric field varies periodically in response to the operating electric signal. Accordingly, if the response of the energy-responsive element, i.e., the variation in electric impedance thereof in response to the incident energy signal, is of such a speed that the impedance variation can follow at least to some extent the incident pulsing or pulsating energy signal, the instantaneous strength of the exciting electric field for the luminescent element may be controlled regularly as well as periodically in response to the wave form of the incident modulating energy signal.

Intensity of luminescence of the luminescent element, however, varies periodically as a function of exciting field strength relating to the wave form of the electric signal.

Since the incident modulating energy signal and the operating electric signal are thus always maintained in synchronous condition, the energy-responsive element is excited at a certain instantaneous value of the electric signal by means of the pulsing or pulsating energy signal. As a result, the impedance of the energy responsive element varies to synchronously control an instantaneous exciting field for the luminescent element periodically. Thus even if the wave forms of the operating electric signal and the incident modulating energy signal are maintained unchanged and their peak values are fixed at certain values, when the phase relation between the incident modulating energy signal and the operating electric signal is changed, the instantaneous value of the exciting field which is to be controlled by that phase relation varies so that the degree of electrical control of the luminescence of the luminescent element by the incident modulating energy signal varies accordingly.

Thus the present invention provides means for controlling the electric field for exciting the luminescent element, the field being a result of the interaction between the variation in the impedance of the energy-responsive element in accordance with the wave form of the incident modulating energy signal and the exciting field applied to the luminescent element.

Accordingly, it will be understood that modulation of the operational characteristic may also be effected by changes in other relations than the above described phase relation.

For example, one of such methods is to change discontinuously the phase relation between the incident modulating energy signal and the operating electric signal. This change produces variation either in the number of times of luminescence of the luminescent element excited by the operating electric signal per unit time or in the number of times of control for the electric field for exciting luminescence of the incident modulating energy signal per unit time. As a result, the number of times of interaction per unit time and periodic relation between the signals, as well as the phase relation between them, are changed simultaneously. Thus the operational characteristic may be changed.

Another method is to change the relation between the wave forms of the signals by changing at least either one of the wave forms of the incident modulating energy signal and the operating electric signal. Since at least either one of the wave forms of the electric field for exciting the luminescent element due to the electric signal and mode of control of the incident modulating energy signal for an exciting field varies, the operational characteristic is changed due to the variation in the resulting interaction. By further combining with the above-mentioned changes in phase relation and in the relation between the wave forms, the operational characteristic can be controlled over an extremely wide range.

The synchronous condition can be established in the following manner when the frequency of the pulsing or pulsating incident modulating energy signal is $f_0$ and that of the pulsing or alternating current electric signal is $f$. Assuming that in a period of $1/f_0$ of the incident modulating signal of frequency $f_0$, the operating electric signal oscillates $$\left(N+\frac{M}{m}\right)$$

times (where N, $m$ and M are such integers that $0\leqq N$, $1\leqq m$ and $0\leqq M<m$, and $M/m$ is zero or an irreducible fraction), the incident modulating energy signal and the operating electric signal are in a phase condition similar to the initial phase condition at every $m$ period so that the incident modulating energy signal excites the energy-responsive element at every $m$ period. Such a state may be called a synchronous condition at the $m$th order. Between $f_0$ and $f$, there exists a relation, $$f=\left(N+\frac{M}{m}\right)f_0 \qquad (1)$$

Therefore, it is sufficient for the relation between their frequencies to be selected so as to satisfy Formula 1.

The above-mentioned state may also be expressed in reference to the pulsing or alternating current electric signal as follows: assuming that $$N_0+\frac{M_0}{m_0}$$

excitations of the energy-responsive element are produced by the incident modulating energy signal in a period of $1/f$ of the operating signal of frequency $f$ (where $N_0$, $m_0$ and $M_0$ are such integers that $0\leqq N_0$, $1\leqq m_0$ and $0\leqq M_0<m_0$, and $M_0/m_0$ is zero or an irreducible fraction), the signals are in a phase relation similar to the initial phase relation at every $m_0$ period so that the incident modulating energy signal excites the energy-responsive element at every $m_0$ period. Such a state may be called a synchronous condition of the $m_0$th order. Thus the synchronous condition can be attained by selecting $f_0$ so as to satisfy $$f_0=\left(N_0+\frac{M_0}{m_0}\right)f \qquad (2)$$

The synchronous conditions appear discontinuously and the number of possible values of N, $N_0$, M, $M_0$, $m$, and $m_0$ increases as the response time of the energy-responsive element to energy excitation gets shorter.

Thus the synchronous conditions may be easily found and established by observing the fact that the blinking of luminescence of the luminescent element resulting from the relation between the frequencies $f$ and $f_0$, in other words, the beat luminescence frequency becomes zero when the solid state energy-responsive luminescent device is actually operated.

From an investigation of the degrees of possible synchronous conditions, i.e., $m$ and $m_0$ under the limitation that $f\leqq f_0$ in Formula 1 or $f\leqq f_0$ in Formula 2, it is found that the upper limits of them which give actually synchronous conditions become higher as the response time of the energy-responsive element gets shorter.

In the present invention, any frequency relation which satisfies Formula 1 or 2 may be selected within a range where a desirable synchronous condition can be realized.

The present invention is applicable to any solid state energy-responsive luminescent apparatus wherein the intensity of luminescence of a luminescent element is electrically controlled through the variation of electric impedance of an energy-responsive element produced in response to excitation of the element by incident energy as described in the beginning. Any other elements may be included as components and the operating electric signal to be supplied is not limited to only one type, but a plurality of types of electric signals may be used. More specifically, a direct current electric signal may be superposed on the operating electric signal. Furthermore, the intensity of incident energy versus luminescence intensity characteristic of the solid state energy-responsive luminescent device may be monotonically increasing, monotonically decreasing, or V-shaped. An incident energy signal may be of uniform intensity or non-uniform intensity similar to two-dimension photographic images.

The present invention has an excellent effect on controlling the operational characteristic of a so-called solid state image conversion amplifier apparatus comprising a photoconductive element as the energy-responsive element and an electroluminescent element as the luminescent element in combination. This effect is indebted to the development of photoconductive materials having such quick response as enables conversion amplification of moving images which has been heretofore impossible.

The present invention will now be described in detail in conjunction with the accompanying drawings in which.

Figure 2:
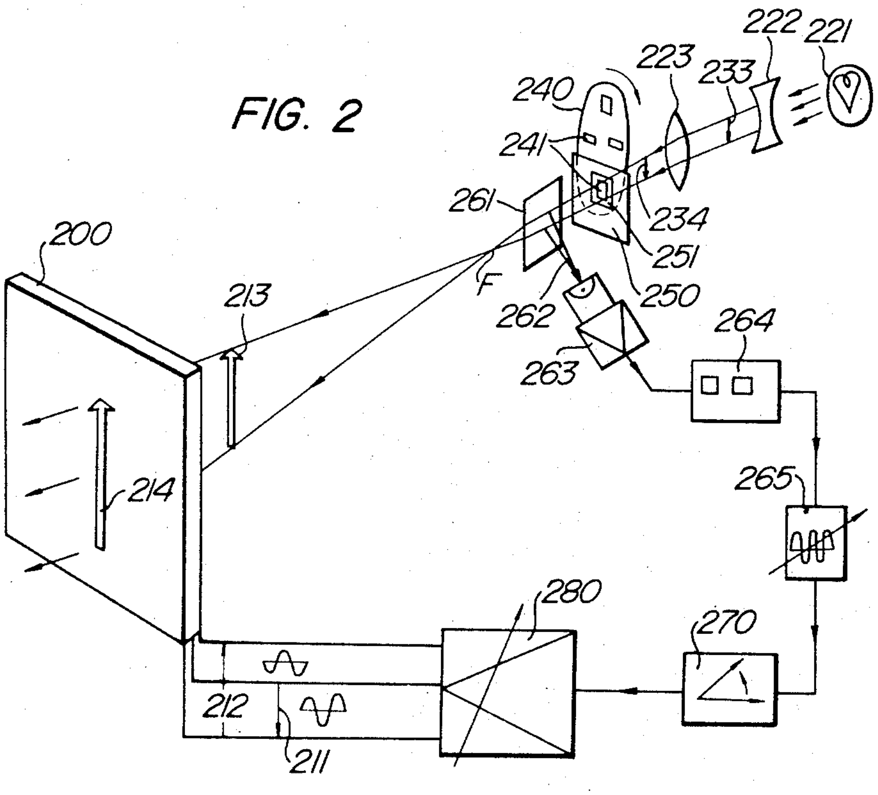
FIG. 2 shows an optical and electric system of an embodiment of solid state luminescent device according to the present invention.
Figure 3:
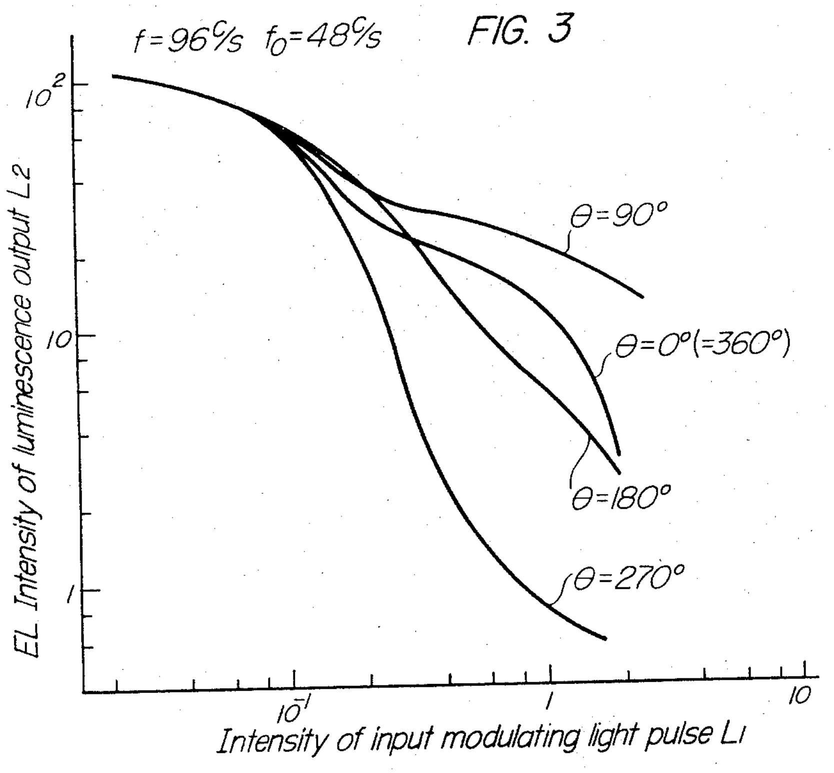
Figure 4:
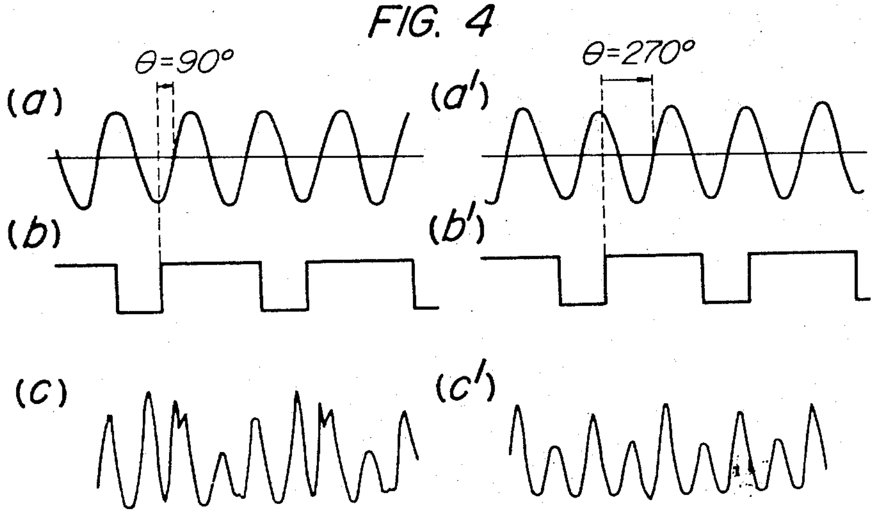
Figure 5:
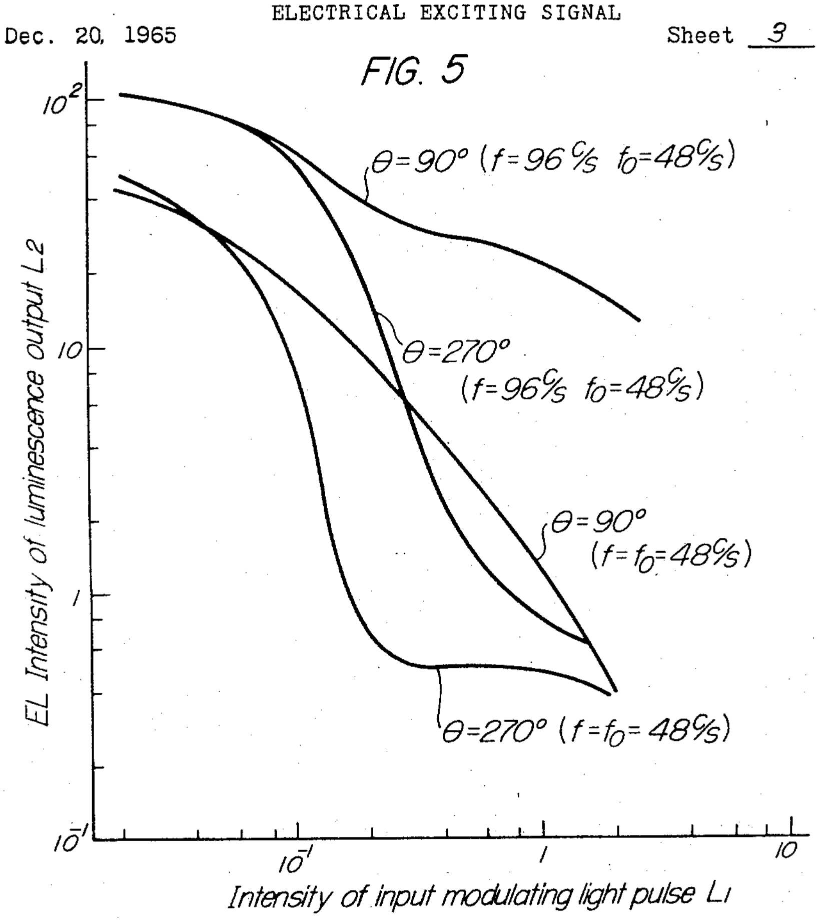
Figure 6:
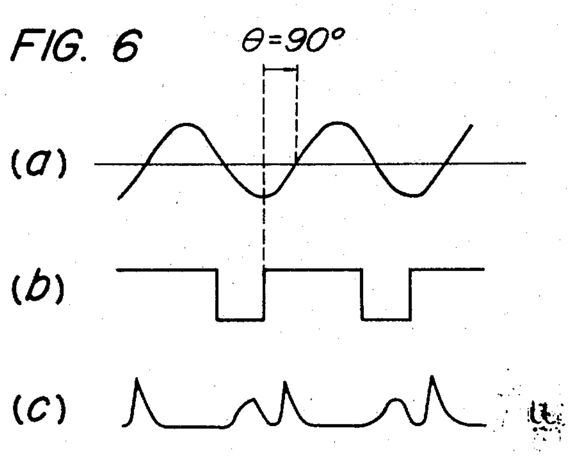

FIGS. 3 and 5 show operational characteristics of the solid state energy-responsive luminescent device shown in FIG. 2; and FIGS. 4 and 6 show wave forms observed on an oscilloscope of the operational characteristics shown in FIGS. 3 and 5.

Figure 1:
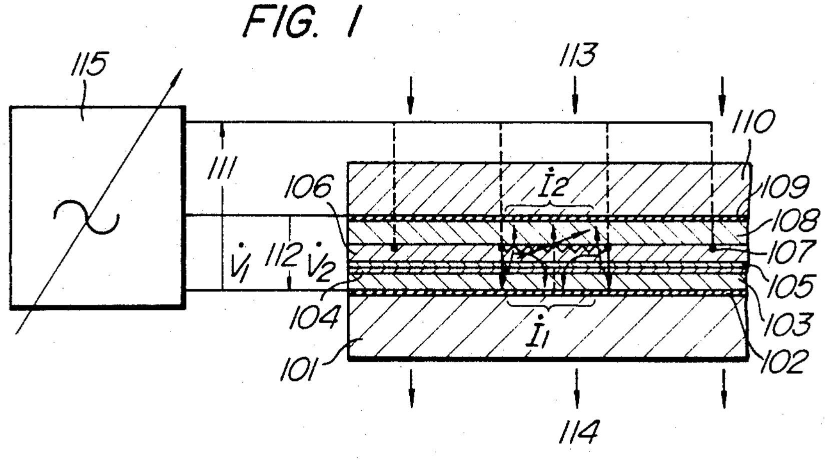
FIG. 1 shows a feeding circuit and a longitudinal section of an embodiment of solid state image plate according to the present invention.

FIG. 1 shows a longitudinal section of a solid state image plate showing an embodiment of a solid state energy-responsive luminescent device and a schematic diagram of an electrical feeding system therefor according to the present invention. In the figure, reference numerals 101 and 110 designate transparent support plates of glass or the like, and 102 and 109 designate light transmitting electrodes formed of a metal oxide such as stannic oxide or the like. An electroluminescent layer 103 is formed of, for example, electroluminescent powder such as ZnS·Cu, Al laminated with a plastic binder to provide a luminescent element of about 50 microns in thickness. A light reflecting insulator layer 104 is formed of light reflecting, highly dielectric powder such as $B_aT_2O_3$ using plastic or the like as the binder and about 20 microns. A highly resistive opaque layer 105 of about 10 microns in thickness is formed of black paint or the like. An energy-responsive element consists of a photoconductive layer 106 of about 80 microns in thickness formed of photoconductive powder of cadmium selenide (CdSe) or cadmium solfoselenide (CdS-CdSe solid solution) having quick response to incident light, activated with an I–B group element such as copper or silver and VII–B group element such as chlorine, or III–B group element such as aluminum and gallium instead of the VII–B group element laminated with a binder of plastic or the like. Electrode 107 is formed of an array of fine metal wires, such as tungsten wires, of about 10 microns in diameter arranged at intervals of 300~600 microns. This electrode may be formed of woven or crossed metal wire or it may be a reticulate electrode formed of metal screen.

A light transmissive dielectric layer 108 of about 50 microns in thickness is formed of, for example, a plastic material. Two operating electric signals 111 and 112 of alternating or pulsing voltage and of the same frequency are applied between the electrodes 102 and 107 and between the electrodes 102 and 109 from a pulsing or alternating current source 115. If an incident light image 113 which is the incident energy signal impinges upon the image plate, output light image 114 of the light signal is radiated from the electroluminescent element 103 corresponding to the incident light image after conversion.

Operation of the solid state image plate is based on the following principle. When the photoconductive layer 106 is excited by an incident light which passed through the light transmissive dielectric layer 108, conductivity of the layer increases, that is, its electric impedance decreases in the direction perpendicular to the incident light beam. This increase of conductivity or the decrease of electric impedance produces a kind of grid action which may be used to electrically control luminescence of the electroluminescent layer 103.

If electroluminescent layer 103 flows an electric current $\dot{I}_3$ which is a vectorial sum of photoelectric current $\dot{I}_1$ associated with transverse photoconductivity which is increased by incident light and with the pulsing or alternating electric signal voltage 111 (hereinafter referred to as $\dot{V}_1$) and capacitance current $\dot{I}_2$ flowing through the photoconductive layer 106 associated with the alternating age source. In the figure, phases of the voltages $V_1$ and $V_2$ age source. In the figure, phases of the coltages $V_1$ and $V_2$ are shown to be opposite to one another. Luminescene of the electroluminescent layer 103 varies nonlinearly in respect to the absolute value of the current $\dot{I}_3$ $$(/\dot{I}_3/=/\dot{I}_1+\dot{I}_2/)$$

i.e., the current amplitude corresponding to the intensity of the electric field. Since the current $\dot{I}_1$ (corresponding to the intensity of the electric field) varies as an increasing function of the intensity of the incident light, the characteristic of the current $/\dot{I}_3/$ which is a function of the intensity of the incident light can be made to be monotonically increasing, monotonically decreasing, or V-shaped, as desired, in response to the intensity of the incident light by properly selecting amplitudes of the voltages $\dot{V}_1$ and $\dot{V}_2$ and the relative phase relation. Moreover, features such as the slope and the range of variation may be regulated suitably.

Accordingly, considering that the electroluminescent layer 103 luminesces in response to the intensity of the electric field or to $/\dot{I}_3/=/\dot{I}_1+\dot{I}_2/$, we can obtain the converted light image 114 of positive, negative or combined positive and negative characteristic corresponding to each of the above-mentioned characteristics and the features of the characteristic with respect to the input light image 113 having two dimensional distribution of intensity. Operational characteristics, such as gamma or white-to-black contrast ratio, of the converted visible image may be also variable to some extent.

The photoconductive layer 106 formed of cadmium selenide or cadmium solfoselenide powder activated with copper and chlorine using an epoxy resin binder was used in this experiment. The response time of this photoconductive layer to energy signal such as visible and infrared rays, electron beams, X rays and $\gamma$ rays is as short as several to several ten milliseconds, although the speed may vary according to the intensity of the exciting energy. The array electrodes 107 are made of tungsten wires of 10 microns in diameter arranged at intervals of 600 microns. The electroluminescent layer 103 was formed of zinc sulphide electroluminescent powder of green luminescence activated with copper and aluminum using a urea resin binder. The thickness of the whole element, excluding the support plates 101 and 110, was about 200 microns.

Electric signals 111 and 112 were both sine wave voltages of the same frequency. The incident modulating energy signal 113 was a square wave light signal of tungsten light, the intensity of which is modulated by means of a light chopper and the synchronous relation between frequency $f$ of the electric signals 111 and 112 and the repetition frequency $f_0$ of the square wave light signal was investigated. Such synchronous relation can be easily investigated by observation of a point where the luminescent beat frequency of the electroluminescent layer 103 becomes zero.

When the frequency $f_0$ is fixed at 48 cycles and the frequency $f$ is varied, the synchronous frequencies of $f$ are 24, 48, 72, 96, 120, 144 . . . as expressed by the relation $$\frac{f_0}{2}n$$

While, when the frequency $f$ is fixed at 50 and the frequency of $f_0$ is varied, the synchronous frequencies of $f_0$ are 25, 50, 75, 100, 125, 150 . . . as represented by the similar relation $$\frac{f}{2}n$$

Here, $n$ designates a positive integer.

Thus, when $f \geqq f_0$, Formula 1 becomes $$f=\tfrac{1}{2}nf_0 \qquad (3)$$

while, when $f \leqq f_0$, Formula 2 becomes $$f_0=\tfrac{1}{2}nf \qquad (4)$$

In Formulas 1 and 2, possible values of the synchronous orders $m$, $m_0$ are $m \leqq 2$, $m_0 \leqq 2$. Considering the quickness of response of the electroconductive layer used in this experiment, the highest order is the second order, that is, the synchronous conditions of either the first or the second order may be equally utilized.

FIG. 2 illustrates an operating system according to the present invention which utilizes the above-mentioned solid state image plate and a block diagram of an embodiment of a solid state energy-responsive luminescent device. This embodiment is an application of the present invention to an apparatus for observing photographic negative films and for determining the printing condition.

Referring to FIG. 2, a solid state image plate 200 is an energy-responsive luminescent device as shown in FIG. 1, a light pulse negative film image 213 is an incident modulating energy signal for exciting a photoconductive layer which is an energy-responsive element, and a converted and amplified light image 214 is a light signal converted, amplified and displayed in relation to the light pulse negative film image 213 which is the incident modulating energy signal impinged upon an electroluminescent layer of the luminescent element.

Operating electric signals 211, 212, corresponding to 111, 112 shown in FIG. 1 are supplied through two paths from a source 280 to the solid state image plate 200.

A negative film 233 is an object to be converted, amplified and displayed. An auxiliary optical system 221, 222 and 223 projects and supplies an incident (light) energy signal to the photoconductive layer of the energy-responsive element, specifically including a light source 221, a condenser lens system 222 and an optical lens system 223 for projecting an image of the negative film 233. Light choppers 240, 250 provide intensity modulating means which intensity modulates the negative film image 234 of the incident energy signal, the intensity of which is continuous in time, thereby to make the light pulse negative film image 213 which is the pulsing or pulsating incident modulating energy signal.

A perforated disc 240 is driven by an electric motor (not shown) and has a plurality of holes 241 arranged equidistantly therein, through which light from the source 221 passes. A fixed masking plate 250 has a hole 251 for passing light.

Thus, the negative film light image 234 is chopped or intensity modulated by the rotating disc 240 when the light passes through the hole 251 and the pulsing incident modulating energy signal of pulsing negative film light image 213 will be formed. The intensity modulating frequency $f_0$ is determined by the rotating speed of the disc 240 and the number of holes 241.

Parts 261 to 265 compose means for establishing the synchronous condition expressed by Formula 1 or 2 between the frequency $f$ of the operating electric signals 211 and 212 and the intensity modulating frequency $f_0$ of the incident modulating energy signal of the pulsing light negative film image 213. Since synchronous conditions of the first and second orders exist in this embodiment, as mentioned previously the synchronous condition of the first order with $f \geqq f_0$, in other words, $m=1$, $M=0$ in Formula 1, and therefore, frequency relation:

$$f=Nf_0 \quad (5)$$

is to be used.

A part 262 of intensity modulated light pulse negative film image is deflected by a half-mirror 261 to excite the photoelectric converter surface of a photoelectric converter amplifier device 263. In this connection, the half-mirror 261, the rotating disc 240 and the masking plate 250 are arranged within the focal length F of the projecting lens system 223 in order to focus the light beam 262 on the photoelectric converter surface. A photomultiplier tube is employed for the photoelectric converter element of the photoelectric converter amplifier 263. The refracted square wave light pulse signal 262 is converted into a pulsing electric signal having a square wave form of frequency $f_0$ by the photomultiplier. This electric signal is at the same time sufficiently amplified in the photomultiplier 263 and applied to a slicer (limiter) 264. In the slicer 264 the amplitude of the signal is controlled to obtain a square wave pulse signal having uniform peak values. This procedure has been considered for the purpose of stabilizing the amplitudes of the operating electric signals 211 and 212 and of convenience of deriving harmonic signals, to always provide a square wave pulsing electric signal having a constant amplitude even when the amount of light of the negative film image 234 is varied due to change in contrast resulting from the change of the negative film 233.

By means of a frequency selection amplifier 265 having a feed back circuit including a variable frequency Wien's bridge, a fundamental sine wave electric signal of frequency $f_0$ or a harmonic sine wave electric signal of frequency $f=Nf_0$ is obtained from the square wave pulsing electric signal of frequency $f_0$.

The relative phase relation between the incident modulating energy signal of the light pulse negative film image and the operating electric signals 211, 212 is controlled by means of a phase-shifter 270 of sine wave electric signal, which shifter is composed of a combination of resistive and capacitive element.

A main amplifier 280 for amplifying the sine wave electric signals of frequency $f=Nf_0$ thus obtained provides a signal source for the electric signals 211 and 212. The main amplifier 280 is of such structure that it can supply the electric signals 211 and 212 through two paths and makes at least either one of phase and amplitude relations variable. Thus the amplifier 280 can display a light signal of positive, negative or combined positive and negative characteristic with respect to the incident modulating energy signal 213 through conversion and amplification.

Thus, a light signal (light image) 214 of any positive, negative and combined positive and negative characteristics with respect to the light pulse negative film image 213 can be obtained. Moreover, the frequencies $f$ and $f_0$ establish a synchronous state which satisfies Formula 1 or 2 and phase relation may be controlled photoelectrically. FIG. 3 shows the operational characteristics of the device of FIG. 2. The synchronous condition employed was a state wherein $f_0=48$ c./s., $m=1$, $M=0$, and $N=2$ in Formula 1, namely, $f=96$ c./s. and hence the second harmonics were employed. The amplitudes of the operating electric signals 111, 211 and 112, 212 were $V_1=0$ v. and $V_2=1500$ v., respectively. The phase difference $\theta$ between the light pulse signal 213 which is the incident modulating energy signal of uniform intensity in two dimensions and the sine wave electric signal 212 was adjusted by means of the variable phase-shifter 270 and was used as a parameter for the curves in FIG. 3. In FIG. 3 the ordinate represents the light intensity $L_2$ of the light signal 214 from the electroluminescent element and the abscissa represents the peak intensity of light $L_1$ of the light pulse signal 213. FIG. 4 illustrates wave forms observed on an oscilloscope, more particularly, FIG. 4($a$) and ($a'$), ($b$) and ($b'$) and ($c$) and ($c'$) are the wave forms of the electric signal 212 or $V_2$, the light pulse signal 213 and the luminescence signal 214 of the electroluminescent element, respectively. The phase difference $\theta$ was measured by the phase difference between the rise of the square wave light pulse signal 213 and that of the single wave electric signal 212 and the measuring range for phase angles was set as $0° \leqq \theta \leqq 360°$ $(=0°)$. The since wave electric signal 212 was represented as a lag angle to the square wave light pulse signal 213.

FIG. 4 shows curves for the cases where $\theta=90°$ and $\theta=270°$. Although the electroluminescent element luminesces twice during a cycle of the directional change in electric field, that is, the electric signal 212 it will be seen from FIG. 4 that wave forms of luminescence vary severely as instantaneous values of the electric field for exciting luminescence to be controlled by the value of $\theta$ vary with change in $\theta$.

It will be apparent from FIG. 3 that the operational characteristic for $V_1=0$ v., $V_2=1500$ v. is negative so that a negative image of the light pulse negative film image 213, that is, inverted positive image, is displayed as the light image 214. It will also be seen from FIG. 3 that the operational characteristic varies over a wide range by controlling $\theta$. More specifically, although gamma and contrast ratio are very low at $\theta<90°$, they become very high at $\theta=270°$. For $\theta=0°$ $(=360°)$ and $\theta=180°$ where phases are shifted by 90° from $\theta=90°$ and $\theta=270°$, respectively, gamma as well as contrast ratio lie midway between the above-mentioned values. But the manner of change in the operational characteristic differs entirely. The nature of the electric impedance of the photoconductive layer changes from capacitive to resistive and return from resistive to capacitive according to increase and decrease of electric conductivity of the layer, and an electric current flowing through the electroluminescent element, i.e. the advanced phase difference of the electric field for exciting luminescence with respect to the electric signal 212, decreases as a result of increase of conductivity when luminescence is excited and increases again when excitation is removed.

Hereinbefore the invention has been described in connection with control of phase difference, but the object of the invention can also be attained by changing the relation of wave forms or frequencies. The relation of wave forms can be changed by changing either of the holes 241 and 251 for passing light through, or by directly amplifying the square wave electric signal from the slicer 264 and utilizing it as the electric signals 211 and 212 or by suitably deforming the selected electric signal when frequency is selected in the frequency selecting amplifier 265.

Selective change of the frequency relation may be done, for example, by changing the speed of rotation of the disc 240 or by changing the order of harmonics selected by adjustment of the frequency selecting amplifier 265.

Since a change of frequency selection causes substantial change in number relation of signals included in a period of each of the energy signal 213 and the electric signals 212 and 211, the change in frequency selection is equivalent to a change in wave form relation. An experimental change in frequency relation will now be described.

FIG. 5 illustrates a result of an experiment in which $f=48$ c./s. that is, $N=1$, $M=0$, and $m=1$ in Formula 1, and hence, the fundamental frequency $f_0$ was used. Characteristics for $\theta=90°$ and $\theta=270°$ are shown, together with the characteristics for $\theta=90°$ and $\theta=270°$ in the case shown in FIG. 3 for comparison.

In FIG. 6, there are shown respective wave form oscillograms for the case of $f=48$ c./s. for reference.

It will be apparent that a change in the frequency relation causes not only a change in the intensity of light output $L_2$ but also severe changes in gamma, white-to-black ratio as well as the tendency of the operational characteristic to change even for the same value of $\theta$.

By using control of the wave form or the frequency relation in combination with the phase control, the characteristic between $\theta=90°$ ($f=96$ c./s., $f_0=48$ c./s.) and $\theta=270°$ ($f=f_0=48$ c./s.) can be continuously controlled over an extremely wide range with only two frequencies, 48 and 96 c./s. for $f$. When it is desired to control variability of the operational characteristic by means of phase difference, all types of operation can be obtained if a signal having the shorter period of the incident energy signal (period: $1/f_0$) and the operating electric signal (period: $1/f$) is made variable in period, that is, the phase angle of $2\pi$, in respect to the other signal since both signals are periodic functions.

Further, two extremities of change in the operational characteristic occur at a phase relation where the signal having the shorter period in respect to the other signal has the relative phase difference of $\pi$, namely one half periods, as shown at $\theta=90°$ and $\theta=270°$. During other half periods, the operational characteristic has different tendencies but common extremities since they are periodic.

It is, therefore, only needed for convenient adjustment and variation of the operational characteristic to make relative phase differences adjustable or variable in a half period.

Since a negative image is obtained with the apparatus shown in FIG. 2, the negative film light image 213 of the negative film 233 may be viewed directly as a converted positive image. Moreover, gamma, contrast ratio or tendency of the operational characteristic may be varied over a wide range by making photoelectric phase relation and/or the relation between frequencies and wave forms adjustable or variable. Accordingly, if calibration indexes such as gamma, contrast ratio and the like are provided on adjusting knobs for these relations, printing conditions and characteristics of negative films can be found from the positions of the knobs where an optium positive image can be observed during adjustment of these knobs. Moreover, blurred negative films formed as a result of improper exposure can be advantageously observed as clearer images by changing the operational characteristic. Although only the negative characteristic has been described in the discussion of this experimental example, the operational characteristic may be similarly made to be adjustable or variable if phase and amplitude relations between the operating electric signals 211 and 212 are made positive, negative or V-shaped (combined negative and positive) by pre-adjusting the main amplifier 280 and the photoelectric phase relation is made adjustable or variable by means of the phase-shifter 270 or if frequency selection amplifier 265 and the like are made adjustable or variable, as described in connection with FIG. 1. Although the width and the duty ratio of the light pulse signal 213 were suitably large in this experiment, the apparatus operated equally well for the light energy pulses of extremely narrow width of about 10 microseconds utilizing a stroboscope. The wave form relation described in connection with the present invention includes the cases where the pulse width and the duty ratio, etc. are varied.

Various other embodiments and modifications may be made within the scope of the present invention so that the invention is not limited to the described specific embodiments.

For example, the solid state image plate shown in FIG. 1 has many important utilizations in industrial and medical fields since it responds also to light beams, X rays and $\gamma$ rays.

If the support plate 110 is removed, the electrode 109 is formed by a deposited metal electrode, such as aluminum, and a cathode luminescent layer is interposed between the electrode 109 and the light transmissive dielectric layer 108 then an electron can be used for the incident modulating energy signal 118, and the device may be incorporated into a television set. In this case, the energy responsive element of the photoconductive layer is excited, in response to the incident modulating energy signal, by light signal produced in the cathode luminescent layer by the incident modulating energy signal of the electron beam.

But the intensity modulation must be defined properly for this case.

In the embodiment shown in FIG. 2, the incident modulating energy signal 213 itself has been, in general, intensity modulated by the light choppers. But intensity modulation is not to be limited to such a case.

Namely, the phenomenon that the intensity of an energy signal for excitation incident upon a certain point in the energy responsive element varies or is made to vary with time with a certain period should be considered to be an intensity modulation.

In the case of the scanning by the electron beam as described above, even though the incident energy signal itself is not acutally intensity modulated when observing at a certain fixed point it may also be regarded to be intensity modulated because the intensity of the incident energy signal for excitation varies periodically and because this case is to be included within the scope of the present invention. Accordingly, means for effecting intensity modulation is a scanning means in this case.

The expression "excite in accordance with incident modulating energy signal" needs also to be clearly defined.

Thus, the case where the cathode luminescent layer is excited by the incident modulating energy signal of an electron beam and the energy responsive element of the photoconductive layer is excited by the converted light signal from the cathode luminescent layer, as described previously instead of being directly excited by the incident modulating energy signal as shown in FIG. 2, is to be included within the above-mentioned definition. Further, the incident modulating energy signal ought to be understood as a modulating energy signal for directly exciting an energy responsive element, irrespective of whether the incident modulating energy signal is primary, secondary or subsidiary.

Various methods may be conceived for realizing each means which is included in the invention. Some of the practical examples thereof will now be described.

A. *Method of intensity modulating an incident energy signal*

(1) A method of periodically controlling the effective light transmitting area of a single or a plurality of slits or light transmitting slots placed in the path of incident light by mechanical or electrical means, when the incident energy signal is a light enery signal.

(2) A method of periodically controlling the effective light transmitting area of a single or a plurality of slits or light transmitting slots provided between a light source and a light transmitting object such as a photographic film when the light energy from the source is directed to the transmissive object and the transmitted light forms incident energy signal.

(3) A method of intensity modulating an incident energy signal by periodically moving or vibrating light filters having different transmissivity placed in the path of the incident energy signal when the incident energy signal is a light energy signal.

(4) A method of forming an incident modulating energy signal of light transmitted through a light transmitting object such as a photographic film by forming a pulsing or pulsating light energy signal by periodically and electrically controlling light emission of a light source when the light energy from the light source is directed to the object and the transmitted light forms an incident energy signal.

(5) A method according to (4) wherein the light source is a stroboscopic or flash light source controlled electrically to emit light synchronously with an applied electric signal.

(6) A method according to (4) wherein the light source is an electroluminescent element with its emission of light being controlled by an alternating or pulsing voltage.

(7) A method comprising controlling a radiation source to produce a pulsing or pulsating incident modulating radiation energy signal when the source of the incident energy is the radiation source with the intensity of its radiating energy being controlled electrically, an object is placed within the path of the radiation from the source and the radiation transmitted through the object forms the incident energy signal.

(8) A method according to (7) wherein the radiation source is a self-reflecting type X-ray tube, the tube voltage of which is an A.C. signal.

(9) A method of intensity modulation effected by scanning the surface of the energy responsive element with an incident energy signal which is of beam shape.

B. *Method of adjusting the wave form relation*

(10) A method in which the size or shape of the effective light transmitting area of a single or a plurality of slits or light transmitting slots are made adjustable or variable when the energy to be controlled is light energy.

(11) A method in which the wave form or period of the controlling electric signal is controlled when light emission of the light energy source is electrically controlled.

(12) A method in which the wave form of the electric signal applied to the solid state energy responsive plate is made adjustable or variable.

C. *Method of selecting the frequency relation*

(13) A method of selection which satisfies $f=Lf_0$ where $f$ and $f_0$ are frequencies of the operating electric signal and the incident modulating energy signal, respectively and L is any integer or a fraction of an integer.

(14) A method of selection which satisfies $$f_1=\frac{1}{2}Kf_k$$

where $f_1$ and $f_k$ are either one or the other of the frequencies of the operating electric signal and the incident modulating energy signal and K is a positive integer.

D. *Method of producing an operating electric signal and selecting frequency*

(15) A method comprising providing an auxiliary energy responsive element to be excited by the incident modulating energy signal and using its converted electric signal as a source of the operating electric signal.

(16) A method comprising an auxiliary energy responsive element formed of a photoelectric converter element responsive to the intensity modulated light between a light transmitting object such as a film and the intensity modulating means and using the converted electric signal from the auxiliary energy responsive element as the source of operating electric signal, when the incident modulating energy signal is formed of light energy transmitted through the light transmitting object and means for performing intensity modulation such as a chopper is provided beween the light transmissive object and the light source.

(17) A method according to (15) or (16) wherein a semi-transmitting body for partly reflecting energy is placed in the path of the incident modulating or intensity modulating energy signal and the auxiliary energy responsive element is excited by the energy signal reflected by the body to obtain a source of the operating electric signal.

(18) A method of obtaining a source of operating electric signal by utilizing variations in electric impedance of the energy responsive element, the impedance variation being caused by excitation by the incident modulating energy signal.

(19) A method comprising placing an auxiliary energy responsive element operating in response to an incident modulating energy responsive element inside or outside of the solid state image plate to obtain the source of the electric signal for operating the solid state image plate from the former element.

(20) A method comprising providing auxiliary slits or light transmitting slots in an opaque body, with the effective area of the light transmitting portion of the slits or slots being changed to modulate the intensity of light from a light source for illuminating a light transmitting object or light from an auxiliary light source so that the auxiliary intensity modulated light may be converted into an electric signal, which is to be used for a source of operating electric signal, by means of a photoelectric converter element, when the incident modulating energy signal is light energy which has been emitted from a light source and transmitted through a light transmitting object or the incident light energy signal itself and the effective light transmitting area of a single or a plurality of slits or light transmitting slots provided in the opaque body is periodically controlled to modulate the intensity of the light energy.

(21) A method comprising providing a contact or contacts and an insulating element or elements alternatively on a support or supports having a slit or slits or a light transmitting slot or slots, which support or supports are to be vibrated or rotated to vary the effective light transmitting area of the slit or slits or slot or slots to modulate the intensity of light energy associated with the incident modulating energy signal, and a stationary contact or contacts which are to be engaged with the first mentioned contact or contacts for establishing a direct current closed circuit with the first mentioned contact or contacts so that an operating electric signal may be obtained by making and breaking the direct current closed circuit as the support or supports vibrate or rotate.

(22) A method of controlling the intensity modulation by an electric signal which is fed from the same source of pulsing an alternating current as that for the operating electric signal.

(23) A method comprising using, for the source of the operating electric signal, an electric signal, or the source thereof, used for vertical or horizontal scanning with an electron beam which provides an incident energy signal.

(24) A method comprising driving a rotary opaque disc by a synchronous motor fed with a driving electric signal supplied by the same source of pulsing or alternating current that for the operating electric signal, with the rotary opaque disc having a light transmitting slot or slots to substantially control the transmission of light through the disc by rotation thereof to modulate the intensity of light which is the energy to be intensity modulated.

(25) A method in which, when the incident modulating energy signal is constituted by the energy emitted by an energy source such as a stroboscopic, flash or electroluminscent light source or an X-ray tube, the energy generation of which is directly electrically controlled by an alternating or pulsing electric signal, after having passed through an energy transmissive object, the source of the alternating or pulsing electric signal for controlling the energy source is the same as that for the operating electric signal.

(26) A method according to any of (15) to (25) comprising keeping the amplitude of either one source signal for the intensity modulating electric signal and the operating electric signal constant by means of a slicer or limiter to stabilize the operation.

(27) A method according to any one of from (15) to (26) wherein the intensity modulating electric signal and the operating electric signal are pulsing or alternating signals associated with any one of the lower harmonics, fundamental oscillation and higher harmonics obtained through frequency selection of the original signals for said signals.

E. *Method of adjusting phase difference*

(28) A method comprising electrically phase-shifting an electric signal associated with the operating electric signal, in a system for supplying the operating electric signal, to control the phase relation of the operating electric signal in respect to the incident modulating energy signal.

(29) A method of controlling phase differences in which the phase of at least any one of the electric signals for intensity modulating the incident energy signal, the operating electric signal and the respective original signals for them is controlled in the form of an alternating current or sine wave by means of a phase shifter circuit.

Although hereinabove the present invention has been described in detail in conjunction with various embodiments thereof, the invention may be practiced in any form of combination of some of these embodiments. Various changes and modifications will be apparent to those skilled in the art without departing from the scope of the invention.

What I claim is:

1. A solid state energy responsive luminescent device comprising an energy responsive element, the electric impedance of which is changed by being excited by an incident energy signal applied thereto, and a luminescent element, the intensity of luminescence of which varies according to the intensity of electric field applied thereto, said device being fed with an operating electric signal from a source connected therewith and selectively displaying a light signal of positive, negative and combined positive and negative nature with respect to the incident energy signal supplied to the energy responsive element on said luminescent element, wherein said device comprises intensity modulating means for intensity modulating the incident energy signal with a frequency $f_0$ to obtain an incident modulating energy signal, means for selecting the relation between $f$ and $f_0$ such that it satisfies $$f=\left(N+\frac{M}{m}\right)f_0$$

where $f$ is the frequency of the electric signal supplied from said source, N is a positive integer including zero, $m$ is a positive integer, M is such an integer that it satisfies $0 \leq M \leq m-1$ and $M/m$ is in the range of zero to an irreducible fraction, and means for making the relation between the incident modulating energy signal and the operating electric signal adjustable and variable.

2. A solid state energy responsive luminescent device according to claim 1, wherein the relation between the incident modulating energy signal and the operating electric signal is the phase relation.

3. A solid state energy responsive luminescent device according to claim 1, wherein the relation between the incident modulating energy signal and the operating electric signal is at least one of the frequency relation and the wave form relation.

4. A solid state energy responsive luminescent device according to claim 1, wherein the relation between the incident modulating energy signal and the operating electric signal is the phase relation and at least one of the frequency relation and the wave form relation.

5. A solid state energy responsive luminescent device according to claim 1, wherein the incident energy signal is a light signal and the intensity modulating means comprises a movable opaque body having at least one slot disposed in the path of the incident energy signal.

6. A solid state energy responsive luminescent device according to claim 1, wherein the incident energy signal is a light signal and the intensity modulating means comprises light filters having different transmissivity.

7. A solid state energy responsive luminescent device according to claim 1, wherein the intensity modulating means is means for periodically and electrically controlling the emission of the incident energy signal from the source of the incident energy signal.

8. A solid state energy responsive luminescent device according to claim 7, wherein the incident energy signal is a light signal, and the source of the incident energy signal is a pulsating light source controlled electrically to emit light synchronously with the operating electric signal.

9. A solid state energy responsive luminescent device according to claim 7, wherein the source of the incident energy signal is an electroluminescent element with its emission of light being controlled by an alternating voltage.

10. A solid state energy responsive luminescent device according to claim 7, wherein the source of the incident energy signal is a radiation source for emitting radiating energy.

11. A solid state energy responsive luminescent device according to claim 10, wherein the radiation source is a self-rectifying type X-ray to which an AC voltage is applied.

12. A solid state energy responsive luminescent device according to claim 1, wherein the incident energy signal is of beam shape and the intensity modulating means is means for scanning the surface of the energy responsive element with the beam.

13. A solid state energy responsive luminescent device according to claim 3, wherein the incident energy signal is a light energy signal and the means for making the wave form relation adjustable and variable is means for making the size and shape of the effective light transmitting area of an opaque body having at least one light transmitting slot adjustable.

14. A solid state energy responsive luminescent device according to claim 3, wherein the means for making the wave form relation adjustable and variable is means for controlling the wave form and period of an electric signal controlling the emission of the incident energy signal from the source of the incident energy signal.

15. A solid state energy responsive luminescent device according to claim 3, wherein the means for making the wave form relation adjustable and variable is means for making the wave form of the electric signal applied to the solid state energy responsive luminescent device adjustable.

16. A solid state energy responsive luminescent device according to claim 1, wherein $$\left(N+\frac{M}{m}\right)$$

is at least a fraction of an integer.

17. A solid state energy responsive luminescent device according to claim 1, wherein when either one of $f$ and $f_0$ is designated by $f_l$ and the other is designated by $f_k$ $$f=\left(N+\frac{M}{m}\right)$$

$f_0$ is $f_l = \frac{1}{2} K f_k$ and K is an integer.

18. A solid state energy responsive luminescent device according to claim 1, wherein the source of the operating electric signal is an auxiliary energy responsive element comprising a photoelectric converter element responsive to the incident modulating signal, the operating electric signal being a converted electric signal from the auxiliary energy responsive element.

19. A solid state energy responsive luminescent device according to claim 18, comprising a semi-transmitting body placed in the path of the incident modulating energy signal to direct the signal to the auxiliary energy responsive element.

20. A solid state energy responsive luminescent device according to claim 1, wherein the source of the operating electric signal is controlled by the variation in the electric impedance of the energy responsive element produced by being excited by the incident energy signal.

21. A solid state energy responsive luminescent device according to claim 1, wherein the source of the operating electric signal is an auxiliary energy responsive element operating in response to the operation of the energy responsive element.

22. A solid state energy responsive luminescent device according to claim 5, wherein the opaque body further has at least one auxiliary light transmissive slot, and the source of the operating electric signal is a photoelectric converter element which converts the light from the light source intensity modulated, by periodically controlling the effective area of at least one auxiliary slot, into an electric signal.

23. A solid state energy responsible luminescent device according to claim 5, wherein the source of the operating electric signal comprises at least one movable contact portion and one insulating portion provided alternately on the opaque body, and a stationary contact which can contact at least one contact portion on the opaque body to establish a direct current closed circuit, the operating electric signal is obtained by moving the opaque body.

24. A solid state energy responsive luminescent device according to claim 1, wherein a source for actuating the intensity modulating means is the source of the operating electric signal.

25. A solid state energy responsive luminescent device according to claim 1, wherein the incident energy signal is composed of an electron beam, and the source of the operating electric signal is a source of an electric signal for vertical and horizontal scan.

26. A solid state energy responsive luminescent device according to claim 5, comprising a synchronous motor for driving the opaque body, a source of an electric signal for actuating the motor being the source of the operating electric signal.

27. A solid state energy responsive luminescent device according to claim 1, wherein the source of the incident energy signal is one of a stroboscopic light source, a flash light source, an electro-luminescent light source, and an X-ray tube, and a source of an electric signal for controlling the source of the incident energy is the source of the operating electric signal.

28. A solid state energy responsive luminescent device according to claim 1, comprising a slicer for making the amplitude of either one of an electric signal for actuating the intensity modulating means and the operating electric signal constant.

29. A solid state energy responsive luminescent device according to claim 1, wherein an electric signal for actuating the intensity modulating means and the operating electric signal is a signal associated with any one of lower harmonics, the fundamental oscillation and higher harmonics obtained through frequency selection of the respective original signals for the signals.

30. A solid state energy responsive luminescent device according to claim 1, comprising means for phase-shifting an electric signal associated with the operating electric signal in the source thereof to control the phase relation between the operating electric signal and the incident modulating energy signal.

31. A solid state energy responsive luminescent device according to claim 1, comprising means for controlling the phase of at least one of an electric signal for actuating the intensity modulating means, the operating electric signal and the respective original signals thereof in the form of an AC or sine wave signal by means of a phase shifter circuit.

References Cited

UNITED STATES PATENTS

| | | | |
|---|---|---|---|
| 2,892,096 | 6/1959 | Kruse | 250—213 |
| 3,210,551 | 10/1965 | Vaughn et al. | 250—213 |

RALPH G. NILSON, *Primary Examiner.*

MARTIN ABRAMSON, *Assistant Examiner.*